(12) United States Patent
Ruch et al.

(10) Patent No.: US 10,871,228 B2
(45) Date of Patent: Dec. 22, 2020

(54) TWO-PART OIL CONTROL RING HAVING AXIAL STABILIZATION AND TWIST COMPENSATION

(71) Applicant: FEDERAL-MOGUL BURSCHEID GMBH, Burscheid (DE)

(72) Inventors: Fabian Ruch, Leverkusen (DE); Dirk Barenreuter, Odenthal (DE)

(73) Assignee: FEDERAL-MOGUL BURSCHEID GMBH, Burscheid (DE)

( * ) Notice: Subject to any disclaimer, the term of this patent is extended or adjusted under 35 U.S.C. 154(b) by 83 days.

(21) Appl. No.: 16/331,217

(22) PCT Filed: Jul. 5, 2017

(86) PCT No.: PCT/EP2017/066728
§ 371 (c)(1),
(2) Date: Mar. 7, 2019

(87) PCT Pub. No.: WO2018/046161
PCT Pub. Date: Mar. 15, 2018

(65) Prior Publication Data
US 2019/0219168 A1 Jul. 18, 2019

(30) Foreign Application Priority Data
Sep. 8, 2016 (DE) .......................... 10 2016 116 807

(51) Int. Cl.
*F16J 9/02* (2006.01)
*F16J 9/06* (2006.01)
(52) U.S. Cl.
CPC .. *F16J 9/02* (2013.01); *F16J 9/06* (2013.01)

(58) Field of Classification Search
CPC . F16J 9/00; F16J 9/02; F16J 9/06; F16J 9/08; F16J 9/10; F16J 9/12; F16J 9/20
See application file for complete search history.

(56) References Cited

U.S. PATENT DOCUMENTS

| 1,613,410 | A | * | 1/1927 | Post | F16J 9/203 |
| | | | | | 277/460 |
| 2,951,732 | A | * | 9/1960 | Brenneke | F16J 9/062 |
| | | | | | 277/451 |
| 3,326,561 | A | * | 6/1967 | Braendel | F16J 9/063 |
| | | | | | 277/472 |
| 6,997,460 | B2 | * | 2/2006 | Brunke | F16J 9/20 |
| | | | | | 277/460 |
| 7,997,185 | B2 | * | 8/2011 | Lahrman | F16J 9/22 |
| | | | | | 92/201 |

(Continued)

FOREIGN PATENT DOCUMENTS

WO WO 2016/078834 A1 5/2016

*Primary Examiner* — Gilbert Y Lee
(74) *Attorney, Agent, or Firm* — Robert L. Stearns; Dickinson Wright, PLLC

(57) ABSTRACT

The present invention relates to a two-part oil scraper ring, which comprises an L-shaped base body and an axial stabilization element. The L-shaped base body has a ring flank leg, which is pressed against a piston ring groove flank by the axial stabilization element, and a bearing surface leg, on which a scraping web is arranged. A twist compensation is attained by means of a suitable selection—and in particular variation—of hearing surface leg length, ring flank leg length and axial position of the scraping web.

18 Claims, 2 Drawing Sheets

(56) References Cited

U.S. PATENT DOCUMENTS

2003/0006562 A1\* 1/2003 Feistel ................ F16J 9/28
　　　　　　　　　　　　　　　　　　277/434
2006/0249913 A1\* 11/2006 Nessa ................ F16J 9/16
　　　　　　　　　　　　　　　　　　277/493

\* cited by examiner

TWO-PART OIL CONTROL RING HAVING AXIAL STABILIZATION AND TWIST COMPENSATION

BACKGROUND

Technical Field

The present invention relates to a two-part piston ring, in particular a two-part oil scraper ring.

Related Art

During motor operation, motor oil is sprayed from the oil sump against the cylinder wall for lubrication. Attention needs to thereby be paid to the fact that a certain amount of oil is necessary in the system to ensure the operability of the piston ring system with regard to friction and to sealing gas from the combustion chamber. This amount of oil is to be kept as small as possible on the one hand, and is to eliminate the hydrodynamic lubricating film on the piston ring bearing surfaces on the other hand. Excess oil needs to be transported into the crankcase again, because this oil can otherwise evaporate in the combustion chamber and thus increases the oil consumption and the pollutant emission.

Typically, two- or three-part systems, in the case of which the tangential force, and thus the pressure with which the bearing surface bears on the cylinder wall, are obtained from a spring, are used as oil scraper rings—hereinafter also referred to as oil rings. In the case of two-part systems, two bearing surface webs, between which the entire tangential force is divided, are arranged on a base body. In the case of three-part systems, two thin rails are used, which are axially separated by the spring and between which the tangential force is divided here as well and which are axially pushed against the groove flanks by means of the spring. Due to the relatively low axial height of the bearing surface webs or of the rails, respectively, a relatively high surface pressure is created and the oil is transported into the crankcase in the downstroke.

SUMMARY

The present oil scraper ring concept is based on the object of keeping the oil consumption across the bearing surface low and to additionally reduce the oil consumption, which is created across the piston ring groove.

The solution is attained by means of a two-part oil scraper ring comprising axial stabilization, comprising a base body comprising an essentially L-shaped cross section, which has a hearing surface leg and a ring flank leg, which together form two legs of the L-shaped cross section, and an axial stabilization element, which is arranged so as to hear at least partially on the ring flank leg, wherein a scraping web is arranged so as to he located externally on the hearing surface leg, wherein the stabilization element is elastic in the axial direction, and wherein an axial length of the bearing surface leg is smaller than an overall axial height of the two-part oil scraper ring.

According to a further aspect of the present invention, the axial length of the bearing surface leg can be in the range of between 15% and 75%, preferably between 20% and 60%, more preferably between 25% and 45%, of an overall axial height of the two-part oil scraper ring.

According to a further aspect, the axial length of the bearing surface leg can vary in the circumferential direction.

According to a further aspect, the radial length of the ring flank leg can be in the range of between 20% and 100%, preferably between 50% and 90%, more preferably between 65% and 85%, of a radial thickness of the two-part oil scraper ring.

According to a further aspect, the radial length of the ring flank leg can vary in the circumferential direction.

According to a further aspect, the scraping web can be arranged on the crankcase-side end of the bearing surface leg.

According to a further aspect, the scraping web can be arranged on the combustion chamber-side end of the hearing surface leg.

According to a further aspect, the axial position of the scraping web on the hearing surface leg can vary in the circumferential direction.

According to a further aspect, the base body can have a twist in the non-installed state.

According to a further aspect, the twist of the base body can vary in the circumferential direction, wherein the twist is preferably designed to be stronger on the ring back than on the joint ends.

According to a further aspect, the radial height of the scraping web can vary in the circumferential direction.

According to a further aspect, the axial stabilization element can be designed as meander spring or can be designed as L-shaped or rectangular tubular spring.

According to a further aspect, the axial stabilization element can have a free length, which is greater than a length of the piston ring groove, in which the two-part oil scraper ring is to be used.

According to a further aspect, the inner edge, at which the inner surface of the bearing surface leg strikes the inner surface of the ring flank leg, can have a rounding or an indent.

According to a further aspect, the non-installed two-part piston ring can have an overall axial height, which is greater than an axial width of the piston ring groove, in which it is to be used.

The usual terminology is used, namely that axially refers to the corresponding direction of the piston, thus the direction of the back and forth movement thereof or to the corresponding axis of the piston cylinder, respectively. The ring axis is the axis, which runs through the center of the ring in the axial direction and which, in the installed state, coincides with the central axis of the piston. A radial direction is thus a direction, which, parallel to the ring plane, runs towards the ring axis at right angles or away from it at right angles. A section, the sectional plane of which includes the ring axis, is referred to as axial section. Dimensions (positions) are each provided with one of the adjectives radial or axial, respectively, in order to make it clear, in which direction measurement (positioning) occurs.

THE DRAWINGS

Exemplary embodiments of the invention will be described in more detail below with reference to the figures, wherein FIG. 1 shows an axial section of an exemplary embodiment of the two-part oil scraper ring of the present invention;

DETAILED DESCRIPTION

Figure 1:
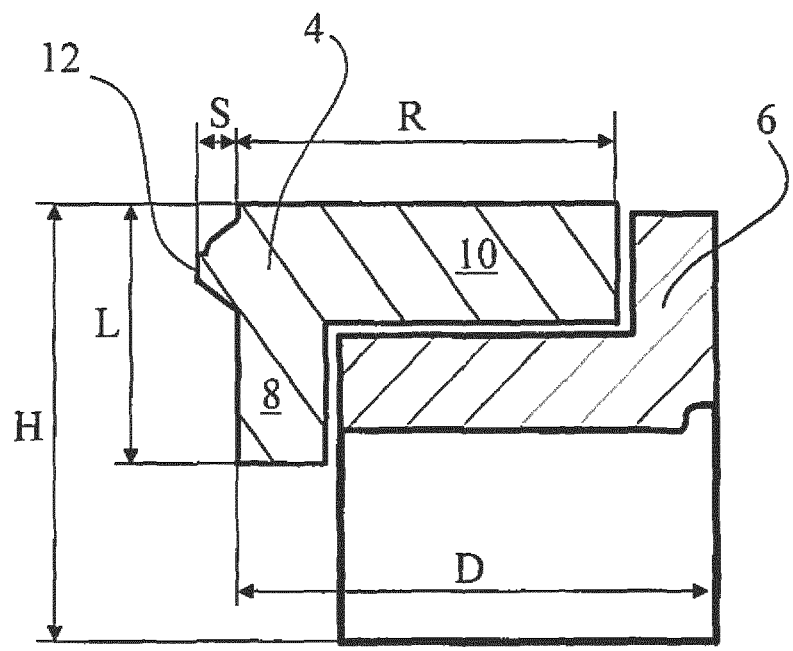

The layout of a two-part oil scraper ring according to an embodiment of the invention is illustrated in FIG. 1 in an axial section according to an exemplary embodiment. The oil scraper ring has a base body 4 with an essentially L-shaped cross section and an axial stabilization element 6. The base body 4 comprises a bearing surface leg 8 and a ring flank leg 10, which together produce the L-shape of the base body. The axial stabilization element 6 is elastic in the axial direction and serves in particular to press the ring flank leg 10 against a flank of a piston ring groove. A scraping web 12, which abuts against the cylinder wall after installation and which takes over the actual scraping function, is arranged radially on the outside on the bearing surface leg 8. Base body 4 and axial stabilization element 6 have an essentially ring-shaped design, wherein the bearing surface leg 8 of the base body 4 is located radially on the outside.

The axial stabilization element 6 is preferably designed as meander or tubular spring; a section of a meander spring is illustrated in an exemplary manner in FIGS. 1-5. The total axial height H of the two-part oil scraper ring is preferably greater than the axial width of the piston ring groove, into which the oil scraper ring is to be installed. The oil scraper ring is then pressed against both flanks of this piston ring groove (the ring flank leg against one flank, the axial stabilization element against the other flank), so that the oil scraper ring is stabilized. More preferably, the axial stabilization element 6 has a circumference, which is greater than the circumference of the piston ring groove, in which the oil scraper ring is to be used. This means that the free length of the stabilization element 6 is greater than the length of the piston ring groove. The axial stabilization element 6 then presses the base body 4 radially to the outside, in addition to the axial stabilization of the oil scraper ring in the piston ring groove, whereby the contact pressure of the scraping web 12 against the cylinder wall is increased.

The oil scraper ring according to the invention is preferably installed in such a way that the ring flank leg is located on the combustion chamber side, which is in each case the upper side in the figures. In the case of this orientation, the ring flank web is additionally pressed against the combustion chamber-side groove flank in response to the downwards movement of the piston by means of the force created as a result of the friction of the oil ring against the cylinder wall, and it is thus prevented that oil reaches to the combustion chamber side via the groove. However, it is also possible, on principle, to use the oil ring with reversed orientation. The orientation information on the combustion chamber side or on the crankcase side, respectively, are to be understood analogously in this case.

The shape of the scraping web corresponds to a scraping web, as it is used in oil control, double-beveled oil control or LKZ rings. The latter have a bearing surface comprising conical and cylindrical portions.

In contrast to conventional, two- or three-part oil scraper rings, respectively, only one scraping web is present, thus ensuring a continuous contact between scraping web 12 and cylinder wall in the circumferential direction in combination with the strong twist as a result of the L-shape. Due to the fact that only one scraping web is present, the hydrodynamic friction portion is further almost halved under identical basic conditions. Significantly weaker springs can furthermore be used in order to attain the same contact pressure and thus the same scraping effect on the web.

In the installed state, i.e. when a force acts radially inwardly on the base body, the cross sectional interruption of the base body 4 due to its L-shape leads to a "twist", i.e. to a tilting, of the base body. The base body tries to evade the force, so to speak, in that it rotates slightly in the axial section. This behavior is also referred to as "twisting". With a corresponding design, this twist can be used to further improve the continuous contact between scraping web and cylinder wall in the circumferential direction.

In FIG. 1, the scraping web 12 is arranged on the combustion chamber side end of the bearing surface leg 8, thus as extension of the ring flank leg 10, the cross sectional interruptions are thus smaller than in the case of an arrangement of the scraping web at another axial position on the bearing surface leg, which leads to a smaller twist.

The occurring twist is in particular also determined by the lengths of the two legs 8, 10 of the base body 4. According to the invention, the axial length L of the bearing surface leg 8 lies in the range of between 15% and 75%, preferably between 20% and 60%, more preferably between 25% and 45%, of a total axial height H of the two-part oil scraper ring. The radial length R of the ring flank leg 10 lies in the range of between 20% and 100%, preferably between 50% and 90%, more preferably between 65% and 85%, of a radial thickness D of the two-part oil scraper ring, wherein the radial thickness D is measured without the radial height S of the scraping web 12.

To reduce the friction—and thus the wear—between L-shaped base body 4 and axial stabilization element 6, the inner edge, at which the inner surface of the bearing surface leg 8 strikes the inner surface of the ring flank leg 10, can have a rounding or an indent (not illustrated in the Figure).

Figure 2:
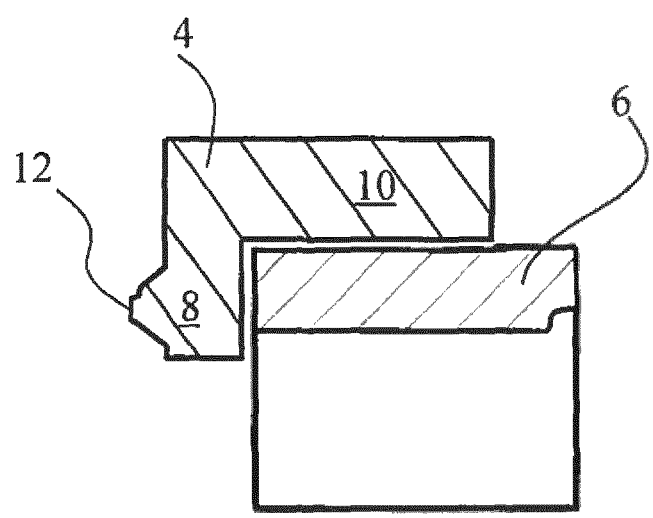
FIG. 2 shows an axial section of a further exemplary embodiment of the two-part oil scraper ring of the present invention.

The embodiment illustrated in FIG. 2 corresponds essential to the embodiment illustrated in FIG. 1. Only the axial arrangement of the scraping web 12 and the shape of the axial stabilization element 6 are different here. The scraping web 12 is arranged here on the crankcase-side end of the bearing surface leg 8. Even though this leads to a stronger twisting, it has the advantage that the area between cylinder wall and bearing surface leg below (or on the crankcase side, respectively) of the scraping web, into which oil can penetrate, is kept small, so that the force, which results from the oil pressure and which attempts to press the oil scraper ring away from the cylinder wall, is also kept small. Due to the open L-shape of the base body, the oil can be guided directly into the piston ring groove and from there into the crankcase through suitable openings in the piston.

It is obviously possible to arrange the scraping web at any axial position on the bearing surface leg; the arrangements shown in FIG. 1 and FIG. 2 are to only serve as example.

While the axial stabilization element 6 in FIG. 1 has an L-shape comprising a "small support foot" for the ring flank leg 10, the axial stabilization element 6 in FIG. 2 has a rectangular cross section. An L-shape comprising "small support foot" is necessary in the case of known three-part oil rings to press the rails against the cylinder wall. The oil scraper ring of the present invention provides for the force transfer through the ring center via the bearing surface leg 8; a small support foot can thus be forgone. The two differences between the figures obviously do not have to appear in combination, but can be varied independently of one another.

Figure 3:
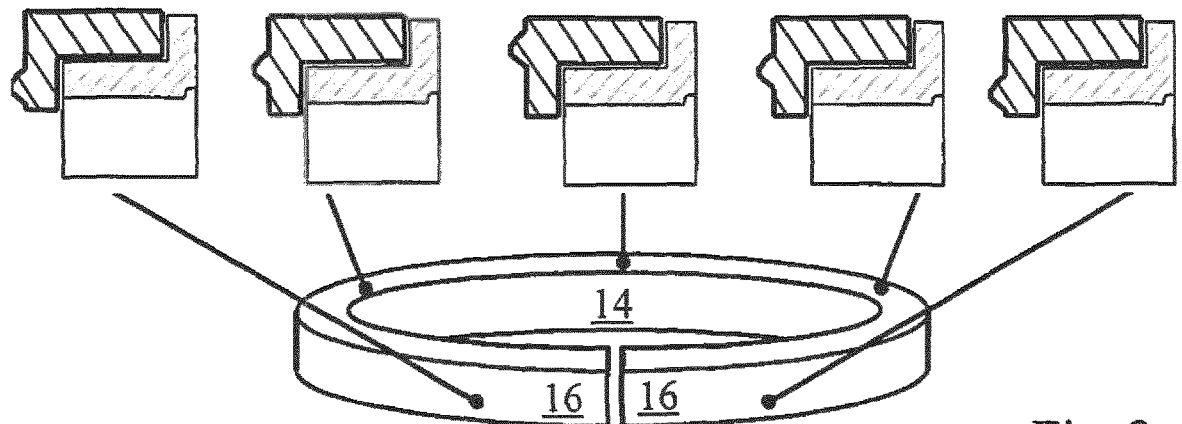
FIG. 3 shows different axial sections of an oil scraper ring in the circumferential direction, each comprising a different axial position of the oil scraping web.
Figure 4:
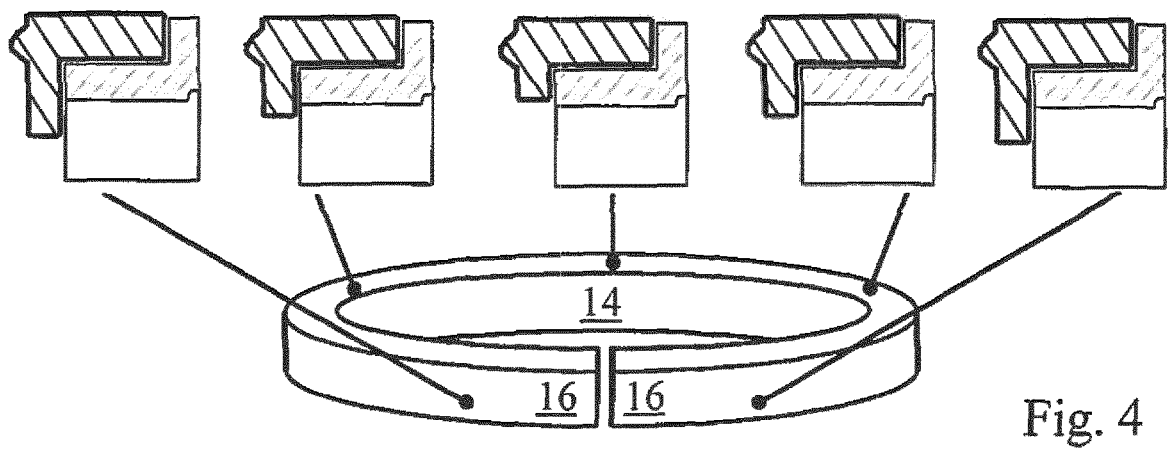
FIG. 4 shows different axial sections of an oil scraper ring in the circumferential direction, each comprising a different axial length of the bearing surface leg.
Figure 5:
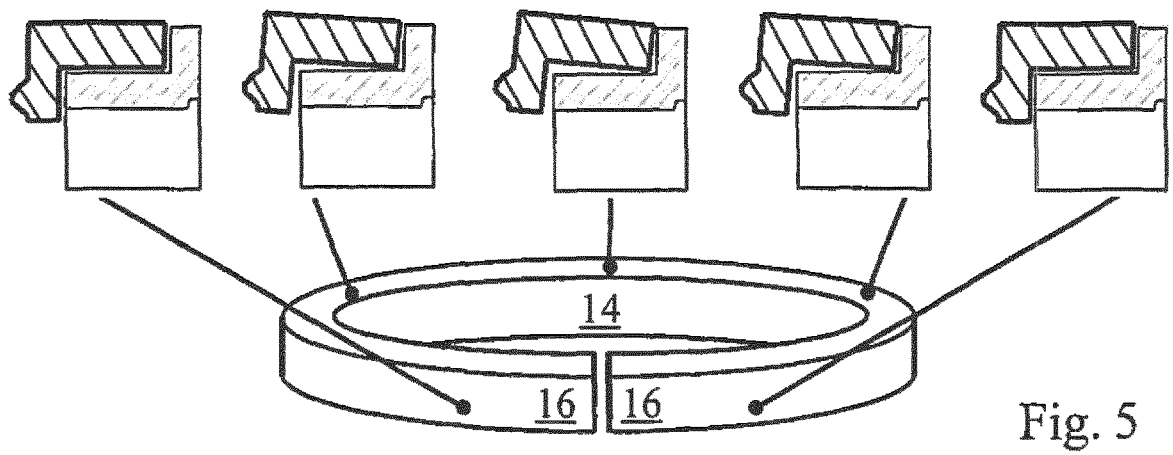
FIG. 5 shows different axial sections of an oil scraper ring in the circumferential direction, each comprising a different pre-twist.

Embodiments are illustrated in FIGS. 3 to 5, which have features, which counteract the tendency to twist, that is, the twisting of the piston ring in the piston ring groove, when said piston ring is tensioned, whereby the scraping behavior can be positively influenced in that the contact pressure against the cylinder wall in the circumferential direction is influenced. The cross sectional interruption, i.e. the deviation from a rectangular shape, which does not lead to a twisting, is varied in the circumferential direction for this purpose by variation of a feature of the L-shaped base body in the circumferential direction in each case. This twist compensation design allows influencing the twist behavior in the circumferential direction. Even though only one feature of the L-shaped base body is varied in each case in the figures, it is also possible as part of the present invention to also vary several of these features simultaneously, if possible.

In FIG. 3, the axial position of the scraping web 12, i.e. the arrangement of the scraping web in the axial direction on the bearing surface leg, is varied in the circumferential direction to compensate the twist. On the joint ends 16, the scraping web 12 is preferably located closer to the free (crankcase-side) end of the bearing surface leg 8 and is farther away therefrom on the ring back 14. This means that the axial distance between scraping web 12 and combustion chamber-side end of the bearing surface leg 8 is greater in the vicinity of the joint ends 16 than on the ring back 14. In this exemplary embodiment, the cross sectional interruption is thus greater on the joint ends 16 than on the ring back 14. Due to the fact, however, that the twist occurring in response to the installation has a greater effect on the ring back 14 than on the joint ends 16, this generally (in response to corresponding design) leads to a twist, which is essentially constant in the circumferential direction, and thus to a contact pressure, which is constant in the circumferential direction, of the scraping web 12 against the cylinder wall. A further advantage of a variation of the axial position of the scraping web 12 in the circumferential is that an oil transport in the circumferential direction is attained thereby and that the oil is thus distributed in the circumferential direction, whereby it is advantageous here to arrange the scraping web 12 on the joint ends 16 closer to the crankcase-side end of the bearing surface leg 8, because oil is otherwise guided away from the ring end gap and cannot reach through the latter to the combustion chamber side. It goes without saying that a variation of the axial position of the scraping web, which differs from the one shown in FIG. 3, in the circumferential direction is possible as well.

In FIG. 4, the length L of the bearing surface leg is varied in the circumferential direction to compensate the twist. Similarly as in FIG. 3, the cross sectional interruption is also greater on the joint ends 16 than on the ring back 14 here, because the bearing surface leg length L is greater on the joint ends 16 than on the ring back 14. In this exemplary embodiment, a compensation of the twist, which occurs more strongly on the ring back, is thus also possible.

Aspects of further exemplary embodiments of the two-part piston ring are illustrated in FIG. 5. The base body 4 is pre-twisted here, in order to overcome the problem of the twist occurring in response to the installation. By means of a predetermined inner twisting, an unwanted twisting during operation is counteracted, in that the predetermined twist, thus the "pre-twist", of the base body in the non-installed, thus non-tensioned state, is designed in such a way that the twist, which occurs when the piston ring is installed, thus is tensioned, is compensated.

Due to the fact that the twist, which occurs in response to the installation, has a stronger impact on the ring back 14 than on the joint ends 16, the base body 4 of the two-part piston ring can also be pre-twisted differently in the circumferential direction, wherein the twist is preferably designed more strongly on the ring back 14 than on the joint ends 16. In response to a corresponding design, a contact pressure of the scraping web 12, which is constant in the circumferential direction, against the cylinder wall can thus be attained. To prevent a possible ring fluttering, it is further conceivable to pre-twist the base body 4 more strongly in the area of the joint ends 16, so that the contact pressure is greater there than at the remainder of the piston rings, or is at least greater than in the areas, which are located between the joint ends and the ring back, respectively. Put together, these two design options have the result that the base body 4 is pre-twisted more strongly in the area of the ring back 14 as well as in the area of the joint ends 16 than in the areas located therebetween. In the case of such a design, the scraping web is preferably located in the vicinity of the crankcase-side end of the bearing surface leg. Of these options, only the one comprising a stronger pre-twist on the ring back is outlined in FIG. 5; the other embodiments just described, as well as a pre-twist, which is constant across the entire circumference, are possible as well.

It is further possible to vary the radial height S of the scraping web 12 in the circumferential direction, which also provides for a direct influencing of the contact pressure against the cylinder wall. A variation of the length R of the ring flank leg 10 in the circumferential direction can be used as well, in order to attain a systematic change of the cross sectional interruption in the circumferential direction. These two variation options are not illustrated in the figures.

Any combination of the variation options (bearing surface leg length L, ring flank leg length R, pre-twist, axial position of the scraping web, scraping web height S) is possible as well. It is conceivable, for example, to simultaneously vary bearing surface leg length and axial position of the scraping web in such a way that the respective effects on the cross sectional interruption (and thus on the twist) cancel each other out, i.e. the scraping web is arranged closer to the ring flank leg (decrease of the cross sectional interruption) in the areas comprising a longer bearing surface leg (increase of the cross sectional interruption). To compensate the stronger twist on the ring back, the ring can additionally be provided, e.g., with a pre-twist, or the simultaneous variation can also be changed in such a way that the effects on the cross sectional interruption no longer cancel each other out. In summary, the twist and thus the contact pressure or the scraping function, respectively, in the circumferential direction can be influenced systematically by means of a corresponding design.

LIST OF REFERENCE NUMERALS 4 base body
6 axial stabilization element
8 bearing surface leg
10 ring flank leg
12 scraping web
14 ring back
16 joint ends
H total axial height of the two-part piston ring
D radial thickness of the two-part piston ring
L axial length of the bearing surface leg
R radial length of the ring flank leg

The invention claimed is:

1. A two-part oil scraper ring comprising axial stabilization, comprising a base body (4) comprising an essentially L-shaped cross section, which has a bearing surface leg (8) and a ring flank leg (10), which together form two legs of the L-shaped cross section, and
an axial stabilization element (6), which is arranged so as to bear at least partially on the ring flank leg (10),
wherein a scraping web (12) is arranged so as to be located externally on the bearing surface leg (8),
wherein the stabilization element (6) is elastic in the axial direction, and
wherein an axial length (L) of the bearing surface leg (8) is smaller than an overall axial height (H) of the two-part oil scraper ring, wherein
the axial length (L) of the bearing surface leg (8) varies in the circumferential direction.

2. The two-part oil scraper ring according to claim 1, wherein the axial length (L) of the bearing surface leg (8) is in the range of between 15% and 75%, of an overall axial height (H) of the two-part oil scraper ring.

3. The two-part oil scraper ring according to claim 1, wherein the radial length (R) of the ring flank leg (10) lies in the range of between 20% and 100%, of a radial thickness (D) of the two-part oil scraper ring.

4. The two-part oil scraper ring according to claim 1, wherein the radial length (R) of the ring flank leg (10) varies in the circumferential direction.

5. The two-part oil scraper ring according to claim 1, wherein, wherein the scraping web (12) is arranged on the crankcase-side end of the bearing surface leg (8).

6. The two-part oil scraper ring according to claim 1, wherein the scraping web (12) is arranged on the combustion chamber-side end of the bearing surface leg (8).

7. The two-part oil scraper ring according to claim 1, wherein the axial position of the scraping web (12) on the bearing surface leg (8) varies in the circumferential direction.

8. The two-part oil scraper ring according to claim 1, wherein the base body (4) has a twist in the non-installed state.

9. The two-part oil scraper ring according to claim 8, wherein the twist of the base body (4) varies in the circumferential direction, wherein the twist is stronger on the ring back (14) than on the joint ends (16).

10. The two-part oil scraper ring according to claim 1, wherein the radial height (S) of the scraping web (12) varies in the circumferential direction.

11. The two-part oil scraper ring according to claim 1, wherein the axial stabilization element (6) is a meander spring, or wherein the axial stabilization element (6) is designed as L-shaped or rectangular tubular spring.

12. The two-part oil scraper ring according to claim 1, wherein the axial stabilization element (6) has a free length, which is greater than a length of the piston ring groove, in which the two-part oil scraper ring is to be used.

13. The two-part oil scraper ring according to claim 1, wherein the inner edge, at which the inner surface of the bearing surface leg (8) strikes the inner surface of the ring flank leg (10), has a rounding or an indent.

14. The two-part oil scraper ring according to claim 1, wherein the non-installed two-part piston ring has an overall axial height (H), which is greater than an axial width of the piston ring groove, in which it is to be used.

15. The two-part oil scraper ring of claim 2, wherein the range is between 20% and 60%.

16. The two-part oil scraper ring of claim 2, wherein the range is between 25% and 45%.

17. The two-part oil scraper ring of claim 3, wherein the range is between 50% and 90%.

18. The two-part oil scraper ring of claim 2, wherein the range is between 15% and 85%.

* * * * *